United States Patent [19]

Milenius

[11] 4,150,009

[45] Apr. 17, 1979

[54] ABS EXTRUSION COMPOSITIONS

[75] Inventor: David L. Milenius, Rocky River, Ohio

[73] Assignee: Abtec Chemical Company, Louisville, Ky.

[21] Appl. No.: 810,653

[22] Filed: Jun. 27, 1977

[51] Int. Cl.$^2$ ............................................. C08K 5/05
[52] U.S. Cl. .......................... 260/33.4 R; 260/880 R; 526/1
[58] Field of Search .......... 260/33.4 R, 876 R, 880 R; 526/1

[56] References Cited

U.S. PATENT DOCUMENTS

| | | | |
|---|---|---|---|
| 3,336,417 | 8/1967 | Sakuma | 260/876 R |
| 3,472,813 | 10/1969 | Hecker | 260/33.4 R |
| 3,997,628 | 12/1976 | Giddings | 260/876 R |
| 4,041,005 | 8/1977 | Talsma | 260/33.4 R |

OTHER PUBLICATIONS

Kirk-Othmer Encyclopedia of Chemical Technology, 2nd Edition, vol. 1, pp. 569-598 and vol. 14, pp. 178-216.

*Primary Examiner*—Paul R. Michl
*Attorney, Agent, or Firm*—J. Hughes Powell, Jr.

[57] ABSTRACT

ABS extrusion compounds which provide extruded articles which retain excellent impact resistance are obtained by including in said ABS compositions a polyalcohol with a melting point less than about 300° C. and a boiling point greater than 200° C. and containing at least four hydroxyl groups.

10 Claims, No Drawings

ABS EXTRUSION COMPOSITIONS

BACKGROUND OF THE INVENTION

ABS compounds are well known molding and extrusion materials, and such compounds find a great variety of uses in tough molded articles such as luggage, protective covers, exterior and interior automobile parts, and the like. In many extrusion processes there has been observed some loss in impact resistance of the extruded articles. Improved compositions, which when extruded into articles, retain good impact resistance are desired.

SUMMARY OF THE INVENTION

Improved ABS extrusion compositions which retain good impact resistance after extrusion are obtained when such compounds include a polyalcohol having a melting point less than about 300° C. and a boiling point greater than 200° C. and which contain at least four hydroxyl groups.

DETAILED DESCRIPTION

ABS plastics are well known extrusion and molding resins. Such resins are generally referred to as graft copolymers. Typical preparations are described, for example, in U.S. Pat. Nos. 3,238,275; 2,948,703; 2,820,773; 3,222,422; 2,908,661; 2,802,808; 3,074,906; 3,010,936; and 3,168,593. The resins are readily obtained by polymerizing styrene and acrylonitrile in the presence of a conjugated diene polymer, usually polybutadiene. The ABS polymers are generally a mixture of rubber particles dispersed in a styrene-acrylonitrile matrix, at least a part of the styrene and acrylonitrile usually being grafted onto the elastomeric polybutadiene backbone. These graft polymers, as is fully described in the literature, are prepared from mixtures of vinyl cyanides as acrylonitrile and methacrylonitrile and vinyl aromatic compounds as styrene, methyl styrene, vinyl toluene and the like, with a conjugated diolefin polymer latex as polybutadiene, or elastomeric butadiene copolymers of butadiene-styrene, butadiene-acrylonitrile, butadiene-alkyl acrylates and the like. Alkyl methacrylates as methyl methacrylate may be used in addition to, or in place of, acrylonitrile and styrene if desired.

Proportions of monomers normally used are about 40 to 90% of combined nitrile and vinyl aromatic with about 60 to 10 parts of diene elastomer. The acrylonitrile preferably is from about 10 to 60% by weight. Blends of ABS resins with other polymers as vinyl chloride polymers, styrene polymers, methyl methacrylate polymers, polyurethanes, polycarbonates, and the like may also be used. Any ABS compound that may be extruded or molded may be used in accordance with this invention.

The polyols or polyalcohols found useful in ABS compounds for extrusion and molding applications requiring retention of impact resistance are those polyols having reasonably low vapor pressure at compounding and extrusion temperatures, and preferably have a melting point below compounding and/or extrusion temperatures. Useful polyols contain 4 to 10 carbon atoms and more preferably have melting points greater than about 50° C. and below 300° C., more preferably, they have melting points from about 70° C. to about 200° C. Higher melting point polyols may be used with suitable adjustment of processing conditions but generally are not preferred. As to vapor pressure at compounding and extrusion temperatures, volatile diols such as 1,5-pentanediol are unsatisfactory and d-mannitol is most effective material for use in accordance with this invention because of its low vapor pressure at processing conditions. Preferably, the compounds have vapor pressures at processing conditions of about 200° to 240° C. of less than about 150 mm.

Useful polyols include erythritol, pentitols such as arabitol, adonitol, xylitol; methyl-pentitols such as rhamnitol; hexitols, preferably including the mannitols, sorbitols, iditol and dulcitol; heptitols such as perseitol, volemitol; methyl heptitols, and the like. Pentaerythritol which has a melting point of 260° C. is less satisfactory becasue of its high melting point although if care is taken during processing it may be used as well as tripentaerythritol and dipentaerythritol. Other polyols include the tetrahydroxybenzenes. In addition to acyclic and alicyclic polyols polyvinyl alcohol, which although it has suitable low vapor pressure, is completely unsatisfactory in providing the improvements obtained in accordance with this invention.

The amounts of the polyols employed in the ABS compositions may be varied from as little as about 0.01 weight part per 100 weight parts of ABS, but more preferably, greater than about 0.1 weight part, up to 5 or more weight parts.

Normally larger amounts are not necessary or required, but amounts as large as 10 weight parts could be used. The polyols may be incorporated into the ABS at any stage of the preparation of the ABS itself or in the subsequent preparation of ABS composition and compounds. In addition to the polyols, the ABS compounds may contain any of the other compounding ingredients used by and known by those skilled in the art to provide useful extrusion and molding ABS compounds. Such additives include, for example, other polymers and resins, stabilizers, antioxidants, coloring agents, fillers, reinforcing agents, processing aids, and the like. These and other ingredients may be mixed with the ABS materials by any of the standard compounding techniques. One convenient method is to mix the compounding ingredients in an internal mixer and extrude in the form of pellets, for example, about ⅛"×⅛" size for ease of later injection or other molding of articles.

EXAMPLE I

To demonstrate the advantages of the invention, 100 weight parts of an ABS polymer containing 27% polybutadiene, 22% acrylonitrile and 51% styrene was mixed in an internal mixer with 0.25 weight part of medium furnace black for color and 1.5 weight parts of a standard hard, high melting, stearamide processing wax. To portions of this compound there was added varying amounts of polyols of the type and amounts set forth in the data Table I below. The drop weight impact was determined as follows: The compounds ware milled at 350° F. for 2 minutes and 0.135" stock was compression molded at 350° F. for 20 minutes. Molded and other samples were placed in a 350° F. oven and the samples were then drop impact tested by ASTM D-3029-B and tested after aging for 15 minutes at 450° F. The drop weight impact after aging and the percent of unaged impact retained after aging are set forth in the table.

| Polyol | Weight Parts | Drop Weight Impact in Ft. lbs. Oven Aged Plaques 15 min. at 450° F. | Percent of Unaged Impact After Aging |
|---|---|---|---|
| d-mannitol | 0.75 | 22 | 90 |
|  | 0.25 | 18 | 82 |
| Inositol | 1.0 | 15 | 68 |
| meso-Erythritol | 1.0 | 17 | 77 |
| d-Sorbitol | 0.75 | 17 | 60 |
| 1,5-Pentanediol | 1.5 | 7 | 35 |
| Control | — | — | 31 |

EXAMPLE II

A 2" pipe was extruded from ABS compounds prepared in accordance with Example I with (1) no sorbitol and (2) 0.5 weight part sorbitol, and during the extrusion the pipe was exposed to air on the inner wall to prevent sticking. The drop weight impact on the extruded pipe was determined in accordance with ASTM D2444. The value for the ABS pipe containing no sorbitol was less than 10 ft.lb. and the value for the ABS containing sorbitol was 58 ft.lb. At −40° F. the drop weight impact of the pipe with no sorbitol was less than 4 ft.lb. and on the pipe containing 0.5 weight part sorbitol, the drop weight impact value was 51 ft.lbs.

When these tests were repeated with other polyphenols such as bisphenol A, corn starch, lactose, sugar and polyvinyl alcohol, the results obtained after 15 minutes oven aging were as follows: bisphenol, less than 6 ft.lb.; corn starch, 9 ft.lb.; lactose, composition burned; polyvinyl alcohol, less than 4 ft.lb.

Injection and molded articles prepared with the compositions of this invention find many uses in interior and exterior applications and appliances, plumbing fixtures, automobile trim, luggage, protective covers, and the like.

I claim:

1. A solid thermoplastic acrylonitrile-butadienestyrene graft copolymer molding resin composition comprising about 40 to 90 weight percent combined vinyl aromatic and vinyl cyanide or alkyl methacrylate grafted on a conjugated diene polymer, said vinyl aromatic being present in amount from about 30 to 80 weight percent, said vinyl cyanide or alkyl methacrylate being present in amount from about 10 to 40 weight percent, and said conjugated diene being present in amounts from about 10 to 60 weight percent, and 0.1 to about 10 weight parts of a polyalcohol containing at least four hydroxyl groups and a melting point less than about 300° C. and a boiling point greater than about 200° C. selected from the group consisting of erythritols, pentitols, adonitol, xylitol, methyl-pentitols, hexitols, heptitols and methyl-heptitols.

2. A composition of claim 1 wherein said polyol contains at least five hydroxyl groups and has a melting point from about 50° C. to about 200° C.

3. A composition of claim 2 wherein said polyol is a hexitol.

4. A composition of claim 3 wherein the vinyl aromatic is styrene, the vinyl cyanide is acrylonitrile and the diene is butadiene.

5. A composition of claim 4 wherein said hexitol is mannitol.

6. A composition of claim 4 wherein said hexitol is inositol.

7. A composition of claim 4 wherein said hexitol is sorbitol.

8. A composition of claim 2 wherein the vinyl aromatic is styrene, the alkyl methacrylate is methyl methacrylate and the diene is butadiene.

9. A composition of claim 8 wherein the said polyol is a hexitol.

10. A composition of claim 9 wherein said hexitol is a mannitol.

* * * * *